Dec. 13, 1960     A. M. ZALKIND     2,963,796
EDUCATIONAL TOY
Filed Feb. 27, 1959
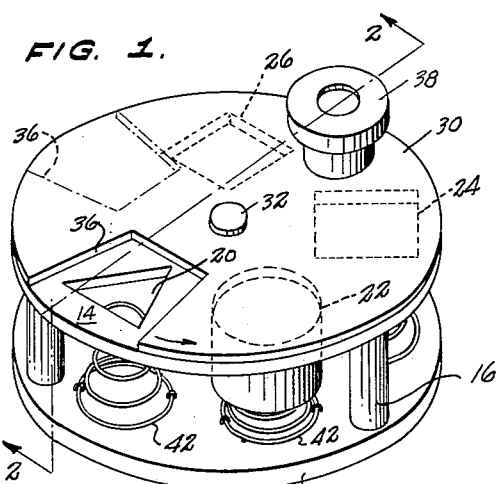
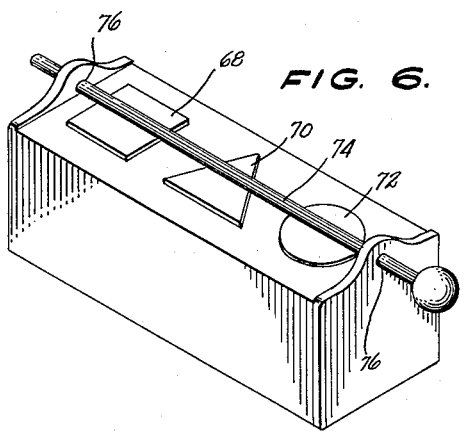
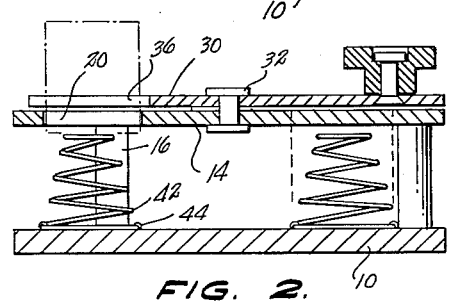
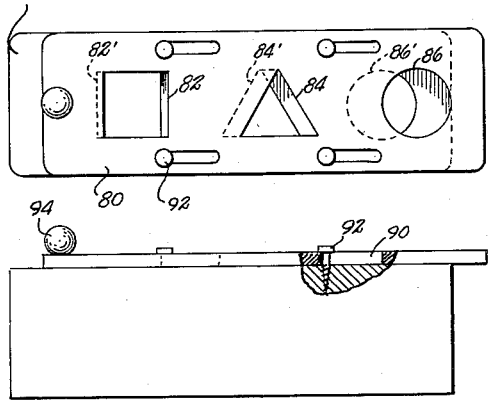
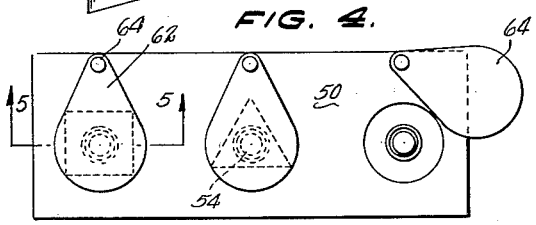
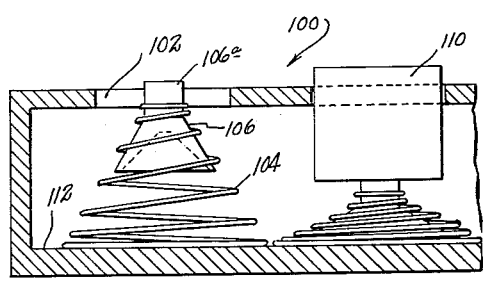
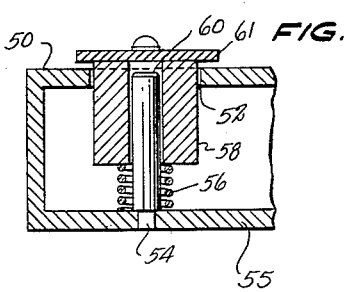
INVENTOR.
Albert M. Zalkind

United States Patent Office 2,963,796
Patented Dec. 13, 1960

2,963,796
EDUCATIONAL TOY

Albert M. Zalkind, Arlington, Va.
(1026 Warner Bldg., Washington, D.C.)

Filed Feb. 27, 1959, Ser. No. 796,058

7 Claims. (Cl. 35—22)

This invention relates to educational toys and more particularly to a type of toy wherein a child is given a series of blocks of various shapes for the purpose of fitting them into apertures of corresponding shapes.

It is an object of the invention to provide a toy of the type described above wherein the blocks are automatically returned in reverse direction through the apertures.

It is a further object of the invention to provide a simple and safe construction.

It is an additional object to provide a toy having a high degree of educational value for children of certain ages from a standpoint of giving training in shape comparison and which also incorporates a high degree of play value by virtue of a simple mechanical aspect involving the use of moving parts.

My invention will now be described in conjunction with the appended drawing in which:

Fig. 1 is a perspective illustrating one mode of carrying out the invention.

Fig. 2 is a section through 2—2 of Fig. 1.

Fig. 3 is a perspective of one of the blocks used in conjunction with the invention.

Fig. 4 is a plan view of another form of the invention.

Fig. 5 is a section through 5—5 of Fig. 4.

Fig. 6 is a perspective of yet another form of the invention.

Fig. 7 is a plan view.

Fig. 8 is an elevation of yet another form of the invention; and

Fig. 9 is a cross-section in elevation of still another form of the invention.

Referring now to the drawing and in particular to Figs. 1, 2, and 3, one form of the invention comprises a base disk 10 and an apertured disk 14 secured in space relation as by posts 16, so as to be an integral unit. The disk 14 has apertures of various shapes cut therethrough; thus, aperture 20 is shown as a triangle while aperture 22 is a circle, aperture 24 a rectangle, and aperture 26 a diamond.

A rotary disk 30 is pivotally carried on the apertured disk 14 as by rivet 32. The disk 30 has a cut-out 36. Rotation of disk 30 will obviously bring the cut-out 36 over any of the shaped apertures 20—26. A knob 38 is provided for convenience in rotating the disk 30. Secured to the base below each of apertures 20—26 is a spring 42 preferably of conical shape. The springs may be stapled as by staples 44 to the base disk 10. A plurality of blocks corresponding in shape to the apertures 20 through 26 are provided. Thus, a triangular block is shown in Fig. 3 which a child can thrust through the aperture 20 of Fig. 1. After the block is thrust through the aperture, compressing the respective spring 42, it can be held down so as to be flush with the surface of disk 14 by rotating (counterclockwise) disk 30 so that the cutout 36 goes beyond the top surface of the block and exposes aperture 22. Thus, disk 30 locks the block in place with the respective spring 42 compressed. In a like manner, suitably shaped blocks may be placed successively in the apertures 22, 24, 26; the disk 30 being rotated each time to lock each block in place. Accordingly, the device would thus have four blocks locked in respective apertures, the cutout 36 ultimately taking the dot-dash position shown. To release the blocks the child merely rotates disk 30 so that the cutout 36 comes over each block in turn, whence the blocks are released one at a time, and each bobs upwardly by virtue of the impetus provided by the respective springs. Obviously the springs should be of a strength which can be suitably compressed by a child's fingers and strong enough to propel the blocks upward a matter of two or three inches.

In the form of the invention shown in Fig. 4, precisely the same principle of operation is utilized except that a rectangular box 50 is utilized having shaped apertures such as 52 in the top panel thereof and a series of pins such as 54 fastened to the bottom panel 55 thereof. Surrounding each pin is a helical spring 56 to be compressed by a respective block 58 which is provided with a bore 50 that encompasses the pins 54. Each block may be provided optionally with a limit plate 61 which may have a corresponding shape. The pins thus act as guides and also serve to prevent the blocks from being pushed sidewise and trapped in the box should they be pushed too far below the top 50 in the event that the blocks are not provided with limit plates.

The locking means in this instance consists of flaps such as 62, pivoted as at 64 so that they can be rotated to cover respective apertures for locking respective blocks in place, or to uncover such apertures as shown at the right side of Fig. 4 to permit the blocks to spring up.

In the form of the invention shown in Fig. 6, the general organization is the same as the embodiment of Fig. 5 except for the locking means for the blocks. Thus, in Fig. 6 the blocks 68, 70, and 72 are shown in pressed down position and it will be understood that they are compressing springs such as 56 of Fig. 5 within the box. A single slidable rod 74 is utilized to lock all the blocks in position. The rod 74 is slidably carried in apertures such as 76 provided in the end of the box. In this form of the invention the blocks must be inserted in the order 72, 70, 68, and the rod slid a suitable distance each time to lock each block as it is pushed into the respective aperture. When the rod is pulled in the proper direction, that is to the right as shown in Fig. 6, each of the blocks will pop up.

In the form of the invention shown in Figs. 7 and 8, a box substantially the same as the form shown in Figs. 4 and 5 is utilized with or without posts such as 54 since it will be apparent that the construction is operable without such posts. However, if posts are not utilized the ends of the box should be left open or the bottom of the box left open so that the blocks will not be trapped therein if pushed too far down.

In this form of the invention, a sliding plate 80 is provided for the box having predeterminedly spaced apertures such as 82, 84, and 86 which are successively fully registerable with the apertures in the top 88 of the box. Thus, 82 fully registers with aperture 82' before 84 fully registers with 84', thence 84 will fully register with 84' before 86 fully registers with 86'.

In order to retain the slidable cover 80 on the box top 88, slots such as 90 co-acting with headed pins such as 92 may be utilized. A knob 94 may also be provided on the cover 80 to render pushing it back and forth more convenient.

From the above description it will be apparent that the aperture 82 in the cover 80 may be aligned with the aperture 82' in the box top 88 and a square block then pushed downwardly through the registering apertures to compress a spring (not shown). With the block then held in position so that the top surface is more or less flush with the top surface of the box top 88, the cover 88 may be slid so as to partially cover the block, thereby locking it in position. This sliding of the cover 88 serves to bring apertures 84 and 84' into registration, and a triangular block may then be pushed in through the registering apertures against a spring, whereat the cover 80 is again shifted, locking the triangular block in place, and bringing aperture 86 in registration with 86'. A cylindrical block may now be placed in position and locked therein by further slight shifting of cover 80.

Accordingly, all three blocks now being locked in position, they may be automatically released by shifting cover 80 to the right as viewed on Fig. 7, the blocks popping up one at a time.

In the form of the invention shown in Fig. 9 the construction comprises a suitable frame or box 100 having a series of shaped top apertures such as 102; for example, a triangle, circle, square, etc. Within the box and aligned with each aperture is a time delay return means comprising a conical spring 104 suitably secured to the bottom 112 of the box. The apex of each spring securely grips a rubber suction cup such as 106 having portion 106a which may be engaged by the bottom of a block which fits the aperture 102. Thus, as each block is pushed down it compresses the spring 104 until ultimately the suction cup engages the surface of the bottom panel 112 of the box or frame to hold the spring compressed. As shown in the right hand portion of Fig. 9, a block 110 is thus positioned substantially within the frame or box and the suction cup is holding the spring in compressed condition. Ultimately the suction cups will release due to the continuing spring pressure, and rising with a snap action, will effect return of respective blocks outwardly of their aperture. Preferably, the spring strength should not be so great as to hurl the blocks, but merely to pop them out of the apertures an inch or two. A particularly important feature of this last embodiment is the fact that a child will endeavor to fit the blocks into their proper apertures and push them downwardly with sufficient rapidity so as to have two, three, or more blocks in downward spring-compressing condition at one and the same time. This is a test of dexterity and muscle control which is deemed to be of special value, in addition to being a test of rapid association of shapes. It will be appreciated that blocks of different profile need not be used; e.g., all of the blocks may be cubes, but of differing sizes, or cylinders, etc. For example, cubes of different girth, or cylinders of differing diameters, to match corresponding apertures are utilizable.

Having thus described my invention, I am aware that various modifications may be made without departing from the spirit thereof and accordingly I do not seek to be limited to the precise illustration herein given except as set forth in the appended claims.

I claim:

1. An educational toy comprising a plate having a plurality of differing apertures, a plurality of blocks to be passed through said apertures from one side of said plate, and means on the other side of said plate adapted to be stressed by respective blocks as they are pushed through respective apertures, and common means for retaining said stressable means in stressed condition, said retaining means being releasable so as to effect return of said blocks in reverse direction through respective apertures, said apertures being of different sizes and said blocks being of corresponding sizes.

2. An educational toy comprising a plate having a plurality of differing apertures, a plurality of blocks to be passed through said apertures from one side of said plate, and means on the other side of said plate adapted to be stressed by respective blocks as they are pushed through respective apertures, and means for retaining said stressable means in stressed condition, said retaining means being releasable so as to effect return of said blocks in reverse direction through respective apertures, said apertures being of different shape and said blocks being of corresponding shape.

3. An educational toy comprising a plate having aperture means and block means shaped to pass through said aperture means from one side of said plate, including time delay return means on the other side of said plate means having an element for supporting said block means when said block means has been inserted in said aperture means, said time delay return means comprising spring means and suction cup means, said spring means being stressed by said block means when said block means is passed through said aperture means, and said suction cup means serving to hold said spring means stressed, whereby said block means is retained in position until said suction cup means releases, said block means then being returned through said aperture means by action of said spring means.

4. An educational toy comprising a plate having aperture means and block means shaped to pass through said aperture means from one side of said plate, including time delay return means on the other side of said plate means having an element for supporting said block means when said block means has been inserted in said aperture means, said time delay return means comprising spring means and suction cup means, said spring means being stressed by said block means when said block means is passed through said aperture means, and said suction cup means serving to hold said spring means stressed, whereby said block means is retained in position until said suction cup means releases, said block means then being returned through said aperture means by action of said spring means, said plate means and said aperture means comprising a plate having a plurality of apertures of differing size, said block means being a plurality of blocks of corresponding size to match the differing sized apertures of said plate.

5. An educational toy comprising a plate having aperture means and block means shaped to pass through said aperture means from one side of said plate, including time delay return means on the other side of said plate means having an element for supporting said block means when said block means has been inserted in said aperture means, said time delay return means comprising spring means and suction cup means, said spring means being stressed by said block means when said block means is passed through said aperture means, and said suction cup means serving to hold said spring means stressed, whereby said block means is retained in position until said suction cup means releases, said block means then being returned through said aperture means by action of said spring means, said plate means and said aperture means comprising a plate having a plurality of apertures of differing shape, said block means being a plurality of blocks of corresponding shape to match the differing shaped apertures of said plate.

6. An educational toy comprising plate means having aperture means therethrough and selective block means shaped to be manually pushed through respective aperture means from one side of said plate means, including individual, automatically operative, time delay return means on the other side of said plate means, wherein said return means comprises resiliently stressable support means for individual block means, said time delay means effecting individual return of individual block means through said aperture means at different times.

7. An educational toy comprising a plate having a plurality of differing apertures, a plurality of blocks to be passed through said apertures from one side of said plate, resiliently stressable means on the other side of said plate adapted to be stressed by respective blocks as they are pushed through respective apertures, and rotative retainer means for retaining said blocks in position against said stressable means, said retaining means having a slot through which all blocks are passable to effect insertion and return of said blocks through said apertures.

References Cited in the file of this patent

UNITED STATES PATENTS

| | | |
|---|---|---|
| 1,877,643 | Brown | Sept. 13, 1932 |
| 2,303,652 | McGaugh et al. | Dec. 1, 1942 |
| 2,377,100 | Patterson | May 29, 1945 |
| 2,416,959 | Segal | Mar. 4, 1947 |
| 2,664,077 | Moore | Dec. 29, 1953 |
| 2,774,150 | Genin | Dec. 18, 1956 |
| 2,774,179 | Zalkind | Dec. 18, 1956 |